United States Patent
Ohta et al.

(10) Patent No.: US 6,670,031 B1
(45) Date of Patent: Dec. 30, 2003

(54) RESIN-COATED METAL SHEET FOR PARTS OF ELECTRONIC MACHINERY AND TOOLS AND PRODUCTION METHOD THEREOF

(75) Inventors: Masaru Ohta, Tokyo (JP); Osamu Kato, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 60 days.

(21) Appl. No.: 09/699,092

(22) Filed: Oct. 26, 2000

(30) Foreign Application Priority Data

Oct. 26, 1999  (JP) ............................................ 11-304289

(51) Int. Cl.⁷ ........................ B32B 11/02; B32B 11/08; B32B 27/20
(52) U.S. Cl. ........................ 428/323; 428/328; 428/332; 428/336; 428/402
(58) Field of Search .................... 428/323, 328, 428/332, 336, 402, 413, 416, 457, 458, 463, 480, 409

(56) References Cited

U.S. PATENT DOCUMENTS

| 5,378,407 | A | * | 1/1995 | Chandler et al. | 252/513 |
| 5,395,687 | A | * | 3/1995 | Totsuka et al. | 428/327 |
| 5,431,795 | A | | 7/1995 | Moreland et al. | |
| 5,624,978 | A | | 4/1997 | Soltwedel et al. | |
| 6,274,224 | B1 | * | 8/2001 | O'Bryan et al. | 428/209 |

FOREIGN PATENT DOCUMENTS

| EP | 0 367 224 A2 | 5/1990 |
| EP | 0 557 928 A1 | 9/1993 |
| JP | 05-320685 | 12/1993 |
| JP | 06-240469 | 8/1994 |
| JP | 6-70870 | 9/1994 |

OTHER PUBLICATIONS

Randall M. German, "Powder Metallurgy Science" (1994) Princeton, New Jersey.

* cited by examiner

Primary Examiner—Paul Thibodeau
Assistant Examiner—Nikolas J Uhlir
(74) Attorney, Agent, or Firm—Knobbe Martens Olson & Bear LLP

(57) ABSTRACT

There is disclosed a resin-coated metal sheet for a part of electronic machinery and tools, which is a metal sheet coated with a resin on the surface, wherein a resin layer is composed of one or more resin selected from polyester-series, epoxy-series, phenol-series and alkyd-series resins, the resin layer has a 0.1 to 10 μm thickness, and the resin layer contains 2 to 60 parts by weight of nickel with 0.1 to 100 μm of an average value in terms of maximum longer diameters, to 100 parts by weight of the resin. The resin-coated aluminum sheet is excellent in anti-fingerprint property and formability, as well as excellent in electric characteristics.

14 Claims, 3 Drawing Sheets

Top-feed method

A coating material is supplied from above.

Bottom-up method

A coating material is supplied to a coater pan.

RESIN-COATED METAL SHEET FOR PARTS OF ELECTRONIC MACHINERY AND TOOLS AND PRODUCTION METHOD THEREOF

FIELD OF THE INVENTION

The present invention relates to a resin-coated metal sheet with conductivity to be used to make parts of electronic machinery and tools, a production method thereof, and parts of electronic machinery and tools obtained by forming or working the metal sheet.

BACKGROUND OF THE INVENTION

Recently, in electronic machinery and tools, such as a drive case for a CD-ROM, a related machinery and tools for a personal computer, and a measuring machinery and tools, further smaller size and light weight are tried to be achieved more than before, and as materials for machinery and tools parts, those compatible thereto are required. For the machinery and tools part material, a good anti-fingerprint property, a high formability and workability (hereinafter, formability and workability are collectively referred to as formability), and electric characteristics (a grounding property and a shield property) not affecting the performance of a precision electronic machinery and tools main body, are required.

Conventionally, as electronic machinery and tools part materials, the following are representative. However, none of them can satisfy all of the above-mentioned required qualities.

First, as a material of parts of electronic machinery and tools, a steel sheet (in particular, plated steel sheet) is most common. However, since the specific gravity of steel sheet is high, it is not suited for the trend toward mobile and lighter-weight electronic machinery and tools. Moreover, an aluminum bear material is widely used as well. Although the aluminum bear material has good conductivity, it has a disadvantage in that fingerprints are left on the surface easily at the time of handling (inferior in stain-proofing property). Therefore, an aluminum-coated material, obtained by applying a resin coat on an aluminum sheet, has been proposed. However, although the aluminum-coated material has a good anti-fingerprint property, it has a large electric resistance value in a coated resin layer, so that desired electric characteristics (a grounding property and a shield property) cannot be obtained when it is made into an electronic machinery and tools part.

Further, an aluminum material has a benefit that it has excellent elongation and expanding property in comparison to other metal materials. Therefore, it is suitable to be applied to forced forming. However, when the above-mentioned conventional metal materials, each having a resin coating on the surface, was applied to forced working, there was such a defect that the resin layer could not keep sufficiently the elongation and expanding property of the aluminum material of base material, to cause peeling or cracking of the resin layer, or the like.

Moreover, these aluminum-coated materials include a material having a coated film that is formed on the surface and that is composed of a mixture obtained by adding a metal soap, for improving the lubricant property and the formability, and a conductive powder (1% by weight or less), for improving the welding property, to a water-soluble lubricant high polymer wax as the main component, as disclosed in JP-A-5-320685 ("JP-A" means unexamined published Japanese patent application). However, in terms of the above-mentioned electric characteristics (a grounding property and a shield property required for recent electronic machinery and tools parts, a targeted effect cannot be obtained.

Furthermore, Japanese Patent No. 2,133,521 discloses a part of electronic machinery and tools obtained by forming a resin-coated film, containing a lubricating agent, only on one side of an aluminum alloy sheet, and applying forming process to the sheet into a floppy disc drive case, with the coated surface on the outer side, so that electrical ground can be obtained through the surface without the coated film on the inner side. Since the side with the resin-coated film does not have conductivity at all, it cannot satisfy the above-mentioned electric characteristics, and there is a limitation in use.

JP-A-6-240469 discloses a resin layer, on a steel sheet provided with a layer subjected to chromate process, which resin layer comprises one or two or more rein selected from the group consisting of epoxy, alkyd, acrylic, urethane, phenol, melamine, polyvinyl butylal, and polyester resins, and is added a powdery lubricating agent, and a conductive auxiliary agent (particles of one or two or more selected from the group consisting of Cu, Ni, Ag, Al, Zn, Cr, Fe, Co, an alloy thereof, carbon black, and carbon graphite) having a 0.1 to 5 $\mu$m average particle size. However, as a result of our testing of the above steel sheet having a resin layer, scattering of conductivity of it was large, and it could not satisfy the grounding property and shield property required.

Moreover, as a conventional coating method, a roll coat has been the mainstream. In particular, a bottom-up method, shown in FIG. 2, is used in most cases. The bottom-up method is, as shown in the figure, a method of storing a coating material (e.g. paint, varnish) in a coater pan, taking up the coating material with a pick-up roll, and transferring the coating material onto an applicator roll, thereby coating on an aluminum sheet. A reverse roller coating, of transferring the coating material by reverse rotation of the applicator roll with respect to the progress direction of the aluminum sheet at that time, is common. However, since the specific gravity of a conductive auxiliary agent of a metal, such as Ni, is much higher than the specific gravity of a coating material, the conductive auxiliary agent is gradually settled in the coater pan, so that a predetermined amount of the conductive auxiliary agent cannot be entered in the resin layer, and thus a desired electric characteristic cannot be obtained.

SUMMARY OF THE INVENTION

Accordingly, in order to overcome the above-mentioned shortcomings of the conventional resin-coated aluminum sheets, an object of the present invention is to provide a resin-coated aluminum sheet with an excellent anti-fingerprint property and formability, and with excellent electric characteristics.

Another object of the present invention is to provide a method of producing the above-mentioned resin-coated aluminum sheet.

Still another object of the present invention is to provide a part of electronic machinery and tools, obtained by forming or working process of the above-mentioned resin-coated aluminum sheet, with excellent electric characteristics (a grounding property and a shield property), capable of achieving light weight.

Other and further objects, features, and advantages of the invention will appear more fully from the following description, taken in connection with the accompanying drawings.

SUMMARY

Figure 1:
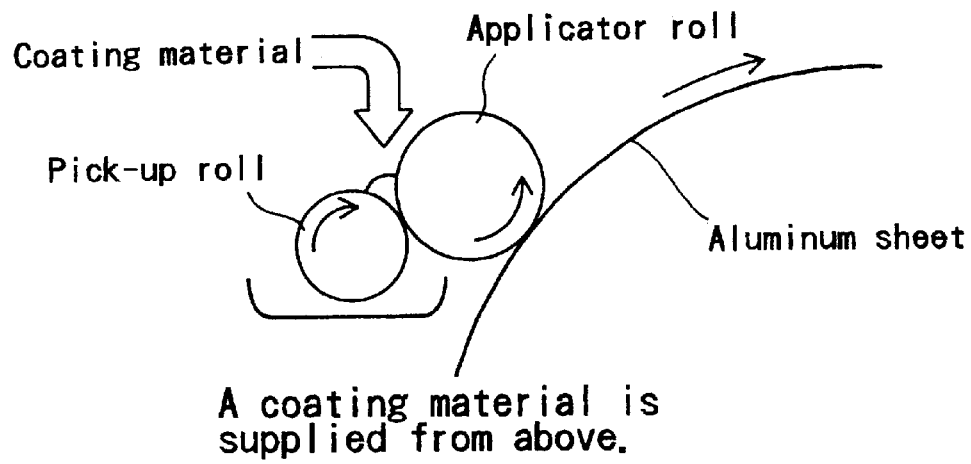
FIG. 1 is an explanatory view of a method of supplying a coating material, according to a top-feed method.

As a result of elaborate study to overcome the problems of conventional resin-coated metal sheets, the present inventors have found that, in order to provide the above-mentioned high electric characteristics (a grounding property and a shield property) without affecting the performance of electronic machinery and tools, it is necessary that, as a material for a part of electronic machinery and tools, the resin layer has electrical resistance value equal to or less than a given value (preferably 10 Ω or less with a measurement method described later). We also have found that, to attain the above resistance value, formation of a resin layer, in which nickel having a specific size is contained with a certain amount, as a conductive auxiliary agent, on the surface of the metal sheet, is effective, and we also have found the optimum kind of the resin, the addition amount, the size and the shape of the nickel necessary in such a resin layer. Moreover, we have found a production method of forming the resin layer stably.

That is, according to the present invention, there are provided:

(1) A resin-coated metal sheet for a part of electronic machinery and tools, which is a metal sheet coated with a resin on the surface, wherein a resin layer is composed of one or two or more resin selected from the group consisting of polyester-series, epoxy-series, phenol-series, and alkyd-series resins, the resin layer has a 0.1 to 10 $\mu$m thickness, and the resin layer contains 2 to 60 parts by weight of a nickel with 0.1 to 100 $\mu$m of an average value in terms of maximum longer diameters, to 100 parts by weight of the resin;

(2) The resin-coated metal sheet for a part of electronic machinery and tools according to the above (1), wherein the nickel is at least one selected from the group consisting of particles of nickel in a shape of spherical, spike spherical, or scale-like, as a simple substance in a state independent of each other, and a chain-shape nickel composed of nickel particles bonded with leach other;

(3) The resin-coated metal sheet for a part of electronic machinery and tools according to the above (2), wherein the nickel is a nickel particle in a shape of spherical, as a simple substance;

(4) The resin-coated metal sheet for a part of electronic machinery and tools according to the above (2), wherein the nickel is at least two selected from the group consisting of particles of nickel in a shape of spike-spherical, particles of nickel in a shape of scale-like, as a simple substance in a state independent of each other, and a chain-shape nickel composed of nickel particles bonded with each other;

(5) The resin-coated metal sheet for a part of electronic machinery and tools according to the above (2), wherein the nickel is a combination of a nickel particle in a shape of scale-like, as a simple substance, and a chain-shape nickel composed of nickel particles bonded with each other, and wherein a ratio by weight of the nickel particle in a shape of scale-like land the chain-shape nickel is 99:1 to 1:1;

(6) The resin-coated metal sheet for a part of electronic machinery and tools according to any one of the above (1) to (5), wherein the metal sheet is an aluminum or aluminum alloy sheet;

(7) The resin-coated metal sheet for a part of electronic machinery and tools according to any one of the above (1) to (6), wherein the resin layer contains 4 to 50 parts by weight of the nickel with 0.1 to 100 $\mu$m of an average value in terms of maximum longer-diameters, to 100 parts by weight of the resin;

(8) The resin-coated metal sheet for a part of electronic machinery and tools according to any one of the above (1) to (7), wherein the resin layer is a layer formed by coating in a top-feed manner;

(9) The resin-coated metal sheet for a part of electronic machinery and tools according to the above (8), wherein the resin layer is a layer formed by coating in a top-feed and direct-roller-coat manner;

(10) A method of producing the resin-coated metal sheet for a part of electronic machinery and tools according to any one of the above (1) to (9), which comprises supplying a coating material in a top-feed manner, roll-coating a metal sheet with the coating material, and drying;

(11) The method according to the above (10), wherein the step of roll-coating is carried out in a direct roller coat manner;

(12) A part of electronic machinery and tools, which is obtained by forming or working the resin-coated metal sheet according to any one of the above (1) to (9); and

(13) The part of electronic machinery and tools according to the above (12), which is a casing.

BRIEF DESCRIPTION OF THE DRAWINGS

FIG. 1 is a side view of an apparatus for top feed roll coating of resin material.

Figure 2:
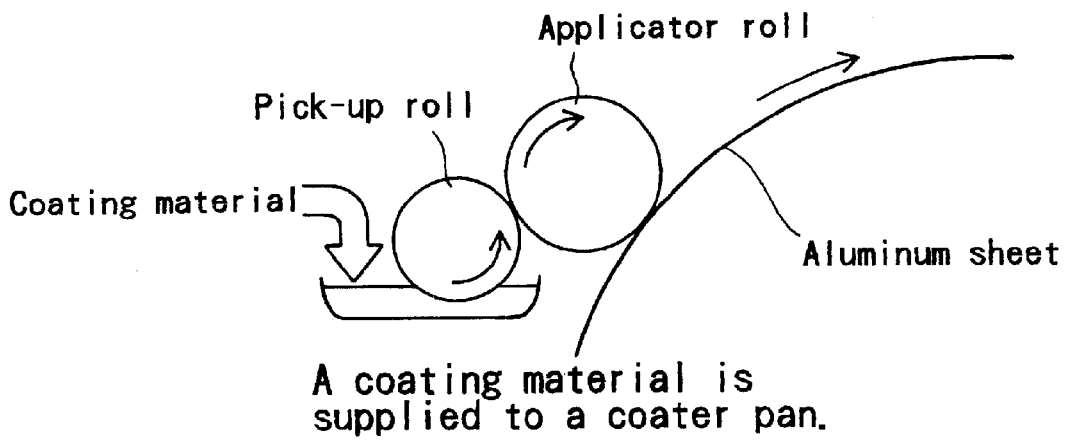
FIG. 2 is an explanatory view of a method of supplying a coating material, according to a bottom-up method.

FIG. 2 is a side view of an apparatus for bottom feed roll coating of resin material.

Figure 3:
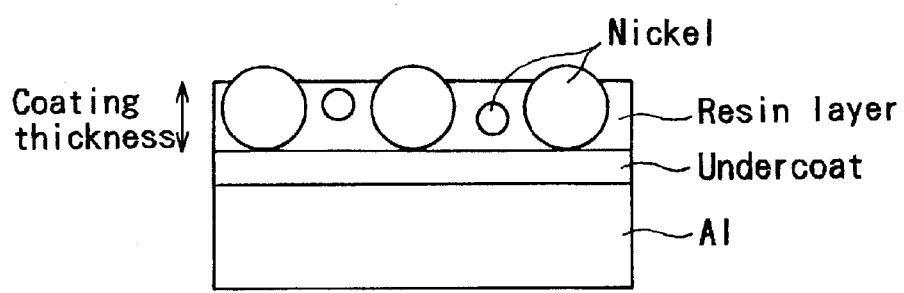
FIG. 3 is an explanatory view of the definition of the coated film thickness.

FIG. 3 is a cutaway view of a resin coated sheet in accordance with one embodiment of the invention.

Figure 4:
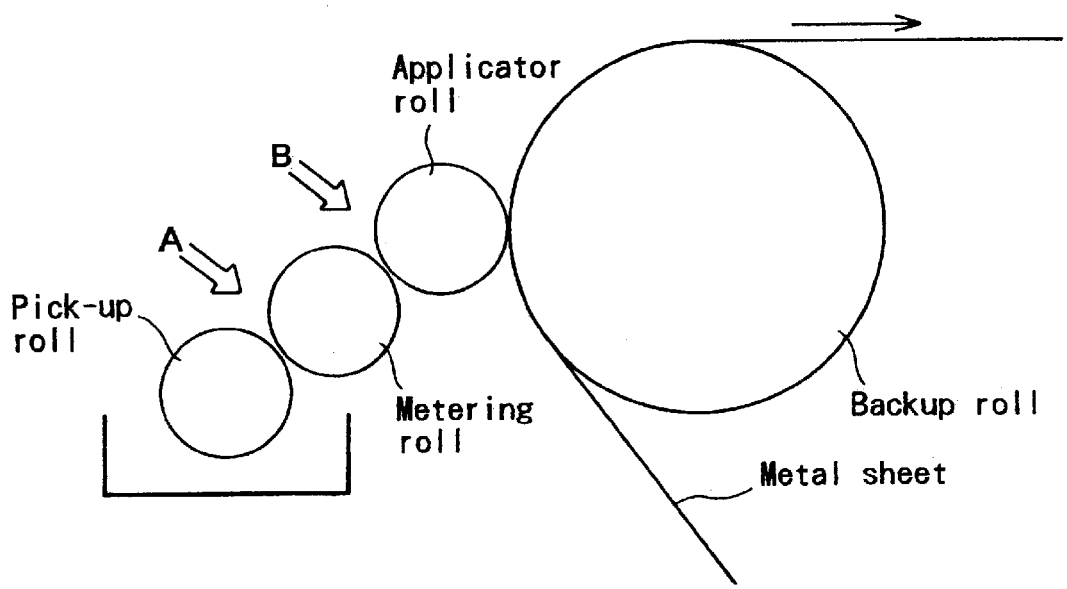
FIG. 4 is an explanatory view of an example of a three-roll method roll coater.

FIG. 4 is a side view of a three roll apparatus for top feed roll coating of resin material.

Figure 5:
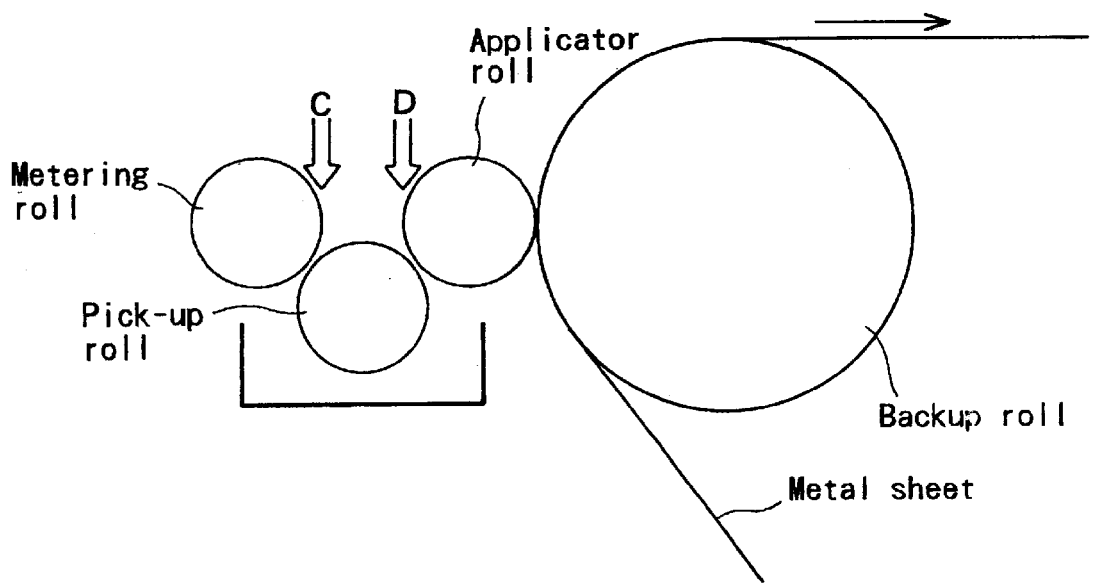
FIG. 5 is an explanatory view of another example of a three-roll method roll coater.

FIG. 5 is a side view of a second embodiment of a three roll apparatus for top feed roll coating of resin material.

Figure 6:
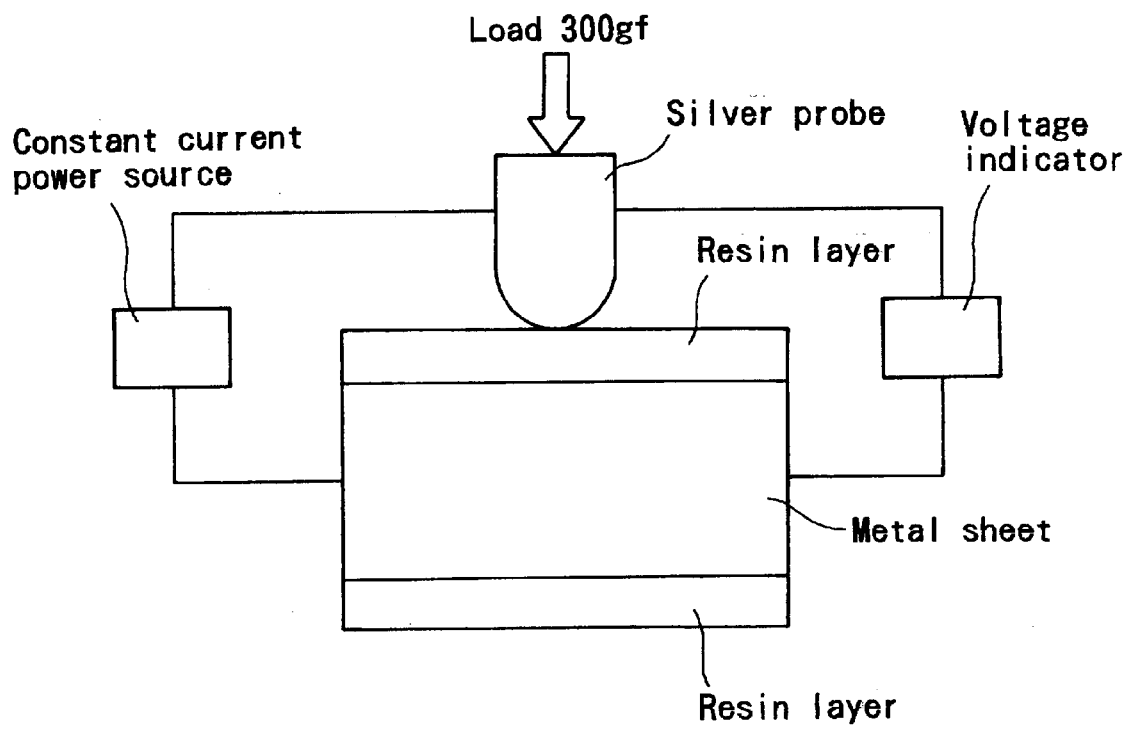
FIG. 6 is an explanatory view of a method to measure an electronic resistance of a resin layer.

FIG. 6 is a block diagram of a resin layer resistance test system.

Figure 7:
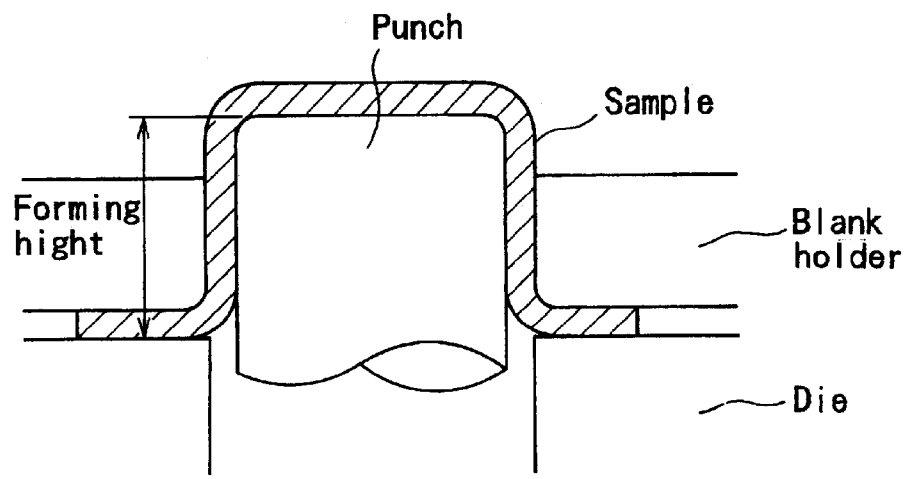
FIG. 7 is an explanatory view of method for a deep drawing test.

FIG. 7 is a side view of a deep drawing test system.

DETAILED DESCRIPTION OF THE INVENTION

The nickel content in the present invention is 2 to 60 parts by weight, preferably 4 to 50 parts by weight of nickel, to 100 parts by weight of the resin in the resin layer. If the nickel content is less than 2 parts by weight, a target electric characteristic cannot be obtained. On the other hand, if it is more than 60 parts by weight, since the resin layer may easily be brittle, film cracking may be occurred when processing, so that contact of the metal material and the molding mold takes place so as to easily rupture the material. Nickel is advantageous for its ease to be dispersed in a coating material, inexpensiveness, and excellent conductivity. In the present invention, nickel is essential, and a metal, such as carbon, zinc, titanium, gold, silver, and copper, or an alloy or an oxide thereof can be added, as long as it is within the range not hindering the desired performance.

In the present invention, it is preferable that the surface occupation ratio of the nickel (the ratio of the projected area of nickel that occupies in a certain area, when a resin layer is projected from vertical direction) is 0.1% or more.

As to the size of the nickel particle for use in the present invention, those having a 0.1 to 100 $\mu$m average value (average diameter) in terms of maximum longer diameters of each particle are preferable. The maximum longer diameter denotes the particle size, in the case of the spherical, spike spherical, scale-like, or chain-like particle, and it is the distance of the two points with the longest linear distance. More specifically, the average diameter of a spherical or spike spherical nickel, and a chain-shape nickel is preferably 0.1 to 20 $\mu$m, and the average particle diameter of a scale-like nickel is preferably 0.1 to 100 $\mu$m. Here, in the case the nickel diameter is larger than the coated film thickness, the resin surface and the metal sheet are conducted via the nickel. In contrast, in the case the nickel diameter is smaller than the coated film thickness, according to the contact of a plurality of particles in the resin, the resin surface and the metal sheet can be conducted. However, with a less than 0.1 $\mu$m average longer diameter, since the conductivity irregularity (scattering) is large, it becomes unstable. That is, in the case the average value in terms of maximum longer diameters is less than 0.1 $\mu$m, since a large number of those having a maximum longer diameter smaller than 0.1 $\mu$m are contained, the ratio of the nickel to be buried in the resin layer becomes large so that the conductivity irregularity is large. With a more than 100 $\mu$m average longer diameter, since the nickel can easily fall off from the resin layer, it is accumulated on the mold so as to easily generate galling or rupture of the material.

The nickel shape to be used in the present invention is preferably spherical, spike spherical, scale-like, or chain-shape. Among these, it is more preferable to include one or two or more. Here, the spike spherical denotes a shape with a plurality of projections protruding from the surface of a sphere like spikes. The scale-like denotes a sheet-like shape. These nickels are added to the resin as a simple substance in a state independent of each other, or with the minute particles bonded with each other (i.e., bonded like a chain or a rosary form) in a narrow long chain shape like a filament. Moreover, spherical includes a shape close to a sphere, such as a ellipsoid body of rotation and a distorted sphere with a rugged part or a flat surface. The same is applied to the spike spherical shape. If conductivity is regarded as important, since a higher height of the nickel projection from the surface is more preferable, it is more preferable to add the spherical or spike spherical nickel as a simple substance, or nickel in a chain shape. The conductivity of the resin layer is preferably 10 $\Omega$ or less, and more preferably 8 $\Omega$ or less, as a value measured in the test method described in the following Example 1. Moreover, if the formability and the external appearance are regarded as important, a scale-like shape capable of obtaining a relatively flat surface is preferable. Furthermore, in order to achieve both the conductivity and the formability, it is effective to mix and add those with a scale-like shape and those of a chain-like shape. As to the mixing ratio, a ratio by weight of the scale-like and the chain-like shape of 99:1 to 1:1 is preferable, and 9:1 to 7:3 is more preferable.

The resin to be used in the present invention can be selected depending on the use of a resin-coated metal sheet, or the kind of a part for electronic machinery and tools to which the metal sheet is formed, or the like. In view of the formability, one or two or more resin selected from the group consisting of polyester-series, epoxy-series, phenol-series, and alkyd-series is preferable. Further, in view of the formability, those containing a polyester-series, or alkyd-series resin are most preferable. As the kind of the polyester-series resin, a phenol denatured polyester, an epoxy denatured polyester, or the like can be presented, and as the kind of the alkyd-series resin, a melamine alkyd resin, an amino alkyd resin, or the like can be presented, but it is not particularly limited. Those having a 2,000 to 30,000 number average molecular weight of the resin in the coating material are preferable in terms of the formability.

In the present invention, the resin layer can be provided either on both surfaces on the metal sheet, or only on one side. The thickness (film thickness) of the resin layer is 0.1 to 10 $\mu$m, more preferably 0.1 to 5 $\mu$m. With a less than 0.1 $\mu$m thickness, galling is generated at the time of forming due to rupture of the resin so as to deteriorate the formability. Moreover, with a more than 10 $\mu$m thickness, the conductivity is deteriorated as well as it is not preferable in terms of the production cost. The relationship between the coating film thickness and the nickel average diameter is not limited as long as it does not impair the performance of the resin-coated metal sheet according to the present invention, but the average diameter is preferably 50 times as much as the coating film thickness or less. The coating film thickness is the thickness of the resin layer, as shown in FIG. 3.

In the present invention, the material of the metal sheet for forming such a resin layer on the surface is not particularly limited, and a steel sheet, copper, aluminum, magnesium, an alloy thereof, or the like can be presented. Among these, a steel sheet can be employed if the purpose is not to form a lightweight product, however, an aluminum material is preferable if the purpose is to achieve mobile and weight saving, and superior formability. The shape can be coil-like, a cut sheet-like, or the like, and it is not particularly limited, but for the homogeneity of performance, the cost, and the productivity, it is preferable to coating on a coil-like material. The sheet thickness is not particularly limited, but it is determined spontaneously in view of the formability and the shape-keeping property, and furthermore, it can be determined according to its application. For example, in the case of an aluminum alloy, in general, those of a thickness in the range of 0.1 to 2.5 mm are used preferably.

In the present invention, in order to improve the formability, a lubricating agent may be added to the resin. As the addition amount, 30 parts by weight or less to 100 parts by weight of the resin is preferable. If the amount of a lubricating agent to be added is too much, the conductivity is deteriorated so that a desired electric characteristic cannot be obtained. As the kind of the lubricating agent to be used at that time, olefin-series waxes, such as polyethylene wax; fluorine-series waxes, such as PTFE (polytetrafluoroethylene); paraffin wax, micro crystalline wax, honey wax, lanolin, carnauba wax, or the like, can be presented.

Moreover, a settling-preventing agent, an anti-foaming agent, a leveling agent, or the like, can be added to the resin, as needed, as long as it does not impair the performance of the resin-coated metal sheet of the present invention.

In the present invention, in order to form a resin layer on a metal sheet, in general, a coating and drying step is executed. Moreover, as needed, a degreasing treatment or an undercoat treatment can be executed before the coating step. For example, in the case for forming a resin layer by applying a coating material of resin on an aluminum sheet, it is preferable to clean the surface by a degreasing treatment, or the like. It is further preferable to form an undercoat, in order to improve the adhesion property and the anti-corrosion property. As the undercoat, a chemical conversion coating is commonly used, but the kind of the chemical conversion coating is not particularly limited. For example, the rinse type or the no-rinse type undercoat of chromate-series, or non-chromate-series (e.g. zirconium-series, titanium-series, phosphate-series, and oxalate-series) can be presented. In view of the performance stability, the productivity, and the cost, it is preferable to select among the chromate-series, the zirconium-series, and the titanium-series. As to the method of forming a chemical conversion coating, the coating can be formed by an ordinary method, such as the rinse type and the no-rinse type, and it is not particularly limited.

As the method for applying a nickel-containing coating material onto a metal sheet, preferable is the top-feed method, shown in FIG. 1, of roll coating a coating material supplied between a pick up roll and an applicator roll from above on the metal sheet by an applicator roll. According to the top-feed method, as shown in the figure, since a coating material needs not be stored in a coater pan, a coating material containing nickel in a high concentration can be applied stably, without causing the nickel settling, so that a resin-coated metal sheet for a part of electronic machinery and tools targeted by the present invention can be produced. Furthermore, the top-feed method includes direct roller coating (with the applicator roll rotation direction same as the metal sheet conveyance direction), and reverse roller coating (the applicator roll rotation direction opposite to the metal sheet conveyance direction). The direct roller coating is preferable. Moreover, in executing the roll coating, there are a two-roll method and a three-roll method. Either method can be used. In the case of the three-roll, the points for supplying the coating material include A, B, C and D, as shown in FIGS. 4 and 5, and either point can be used as the supply point. The points A and C are more preferable, since a leveling effect of a coating material by the intermediate roll can be provided.

In the present invention, after the application of a coating material by the above-mentioned method, drying is executed by an ordinary manner. The drying process is preferably conducted at 100 to 300 ° C., which is the maximum temperature that the metal sheet can reach (PMT).

A resin-coated metal sheet material according to the present invention can be used in every part of electronic machinery and tools, such as casings including a drive case for a CD-ROM, CD-R/RW, DVD-ROM, DVD-RW, FD, and MO, a related machinery and tools for a personal computer, and a measuring machinery and tools part that requires grounding and/or shielding property.

The resin-coated metal sheet of the present invention is excellent in conductivity as well as formability, so that it can be used preferably in a part of electronic machinery and tools. Moreover, according to the production method of a resin-coated metal material of the present invention, a resin-coated metal material for a part of electronic machinery and tools, with a high nickel content, a homogeneous distribution thereof in the entirety, and the excellent conductivity can be produced.

Furthermore, the part of electronic machinery and tools of the present invention is light in weight, excellent in conductivity, good in grounding property and shield property, and it is capable of taking the grounding from the resin-coated surface side, and it has good anti-fingerprint property and handling propererty, and thus it is preferable for precision electronic machinery and tools, wherein high electric characteristics are required.

Hereinafter the present invention will be explained in further detail based on examples. The present invention is not limited to the following examples in the range not departing from the scope of the claims.

EXAMPLE

Examples 1 to 8, and Comparative Examples 1 to 3

An aluminum coil (5052-0, sheet thickness 0.5 mm) was subjected to a degreasing treatment with a commercially available alkaline-series degreasing agent. After washing with water, a undercoat treatment was applied so as to form a chromate phosphate coating (chemical name: Alsurf 407/47 (trade name), manufactured by Nippon Paint Corp.). The undercoat amount at that time was 15 mg/m² in terms of the metal chromium amount. Thereafter, on both surfaces of the resultant aluminum sheet, a coating material with a nickel added was coil-coated by a top-feed-direct-roller-coating method, as shown in FIG. 1, followed by a usual baking (for example, 250° C. for 1 min to the polyester-series resin), to form a resin layer of 2 μm in thickness for each side. The resin-coated aluminum sheet was applied with forming process so as to obtain a predetermined electronic machinery and tools part. In this series of examples, a spherical nickel or a chain-shape nickel, having a 9 μm average particle diameter, was used, with the content of nickel was being changed, to examine the influence thereby. The kind of the resin, the shape, the average diameter, and the content (the value to 100 parts by weight of the resin) of the nickel contained in the resin layer, are shown in Table 1.

The specific features of resins employed are as follows:
(a) Polyester-series resin: ESPEL9940 (trade name), manufactured by Hitachi Chemical Co., Ltd.
(b) Epoxy-series resin: Epicoat 1009 (trade name), manufactured by Yuka Shell Epoxy Co.
(c) Phenol-series resin: Super Beckaclite (trade name), manufactured, by Dainippon Ink and Chemicals, Incorporated
(d) Alkyd-series resin: Phthalkid (trade name), manufactured by Hitachi Chemical Co., Ltd.
(e) Acryl-series resin: Hitaloyd (trade name), manufactured by Hitachi Chemical Co., Ltd.
(f) Silicone-series resin: KR211 (trade name), manufactured by Shin-Etsu Chemical Co., Ltd.
(g) Fluorine-series resin: Lumifulon (trade name), manufactured by Asahi Glass Company.

The conductivity and the formability of the obtained resin-coated aluminum sheets were tested by the following method. The results are shown in Table 1.

(2) Formability

The obtained resin-coated aluminum sheets each were applied with a commercially-available volatile lubricating oil (viscosity: 1.2 cSt), and deep-drawn, with a 40-mmφ punch diameter and a 84-mmφ blank diameter, into a cylindrical shape. The forming height is the height when ruptured (a height of the drawn sample when the sample was ruptured; see FIG. 7) was found and evaluated according to the following standards. The higher the forming height is, the more preferable it is, but, as a part of electronic machinery and tools, those having a formability of E or higher can be used.

[Evaluation Standards]

A: the forming height was 8.5 mm or more.

B: the forming height was 8.0 mm or more and less than 8.5 mm.

C: the forming height was 7.5 mm or more and less than 8.0 mm.

D: the forming height was 7.0 mm or more and less than 7.5 mm.

E: the forming height was 6.5 mm or more and less than 7.0 mm.

F: the forming height was 6.0 mm or more and less than 6.5 mm.

G: the forming height was less than 6.0 mm.

TABLE 1

| Classification | No. | Nickel Shape | Average diameter (μm) | Content (weight parts) | Kind of resin | Performance Conductivity (Ω) | Formability Forming height |
|---|---|---|---|---|---|---|---|
| This invention | 1 | Spherical | 9 | 2.2 | Polyester-series | 9.3 | D |
|  | 2 | Spherical | 9 | 5.1 | Polyester-series | 6.9 | D |
|  | 3 | Spherical | 9 | 10.5 | Polyester-series | 5.3 | D |
|  | 4 | Spherical | 9 | 28.3 | Polyester-series | 3.6 | D |
|  | 5 | Spherical | 9 | 59.5 | Polyester-series | 1.5 | E |
|  | 6 | Chain-like | 9 | 3.1 | Polyester-series | 8.7 | C |
|  | 7 | Chain-like | 9 | 5.3 | Polyester-series | 7.3 | C |
|  | 8 | Chain-like | 9 | 20.4 | Polyester-series | 4.8 | C |
| Comparative example | 1 |  | (Not added) |  | Polyester-series | $10^6$ or more | D |
|  | 2 | Spherical | 9 | 0.05 | Polyester-series | $10^6$ or more | D |
|  | 3 | Spherical | 9 | 62.4 | Polyester-series | 1.1 | G |

(1) Conductivity

With respect to the obtained resin-coated aluminum sheets, according to the four-point probe method as shown in FIG. 6, the resistance value, when contacting a silver probe (5 mm diameter, tip end 2.5 R) with a coated surface by a 300 g load, was measured.

Examples 9 to 14, and Comparative Examples 4 to 6

In the same manner as in the Examples 1 to 8 according to the present invention, an aluminum coil was subjected to a chemical conversion treatment and coating, to form a resin layer. The thickness of the resin layer at that time was 2 μm. In this series of example, the kind of the resin was changed for examining the influence thereby. The kind of the resin, the shape, the average diameter, and the content of the nickel contained in the resin layer are shown in Table 2. The conductivity and the formability of the obtained resin-coated aluminum sheets were tested by the same method as in the Examples 1 to 8 according to the present invention. The results are shown in Table 2.

a chemical conversion treatment and coating, to form a resin layer. In this series of examples, the coating film thickness was changed for examining the influence thereby. The kind of the resin, the coating film thickness, and the shape, the average diameter, and the content of the nickel contained in the resin layer are shown in Table 3. The conductivity and the formability of the obtained resin-coated aluminum sheets were tested by the same method as in the Examples 1 to 8 according to the present invention. The results are shown in Table 3.

Examples 20 to 35, and Comparative Examples 9 to 10

In the same manner as in the Examples 1 to 8 according to the present invention, an aluminum coil was subjected to

TABLE 2

| | | Nickel | | | | Performance | |
| | | | Average diameter ($\mu$m) | Content (weight parts) | | Conductivity ($\Omega$) | Formability Forming height |
| Classification | No. | Shape | | | Kind of resin | | |
| This invention | 9 | Spherical | 9 | 19.8 | Polyester-series | 4.8 | D |
| | 10 | Spherical | 9 | 17.2 | Epoxy-series | 6.0 | E |
| | 11 | Spherical | 9 | 20.5 | Epoxy-series + Phenol-series | 4.7 | E |
| | 12 | Spherical | 9 | 19.3 | Alkyd-series | 5.0 | D |
| | 13 | Spherical | 9 | 18.7 | Alkyd-series + Epoxy-series | 5.3 | D |
| | 14 | Spherical | 9 | 19.2 | Polyester-series + Epoxy-series | 5.0 | D |
| Comparative example | 4 | Spherical | 9 | 18.4 | Acryl-series | 5.5 | F |
| | 5 | Spherical | 9 | 17.7 | Silicone-series | 5.7 | F |
| | 6 | Spherical | 9 | 17.3 | Fluorine-series | 5.9 | F |

Examples 15 to 19, and Comparative Examples 7 to 8

In the same manner as in the Examples 1 to 8 according to the present invention, an aluminum coil was subjected to

TABLE 3

| | | Nickel | | | Resin | | Performance | |
| | | | Average diameter ($\mu$m) | Content (weight parts) | | Coating thickness ($\mu$m) | Conductivity ($\Omega$) | Formability Forming height |
| Classification | No. | Shape | | | Kind | | | |
| This invention | 15 | Spherical | 9 | 20.2 | Polyester-series | 0.2 | 1.9 | D |
| | 16 | Spherical | 9 | 18.3 | Polyester-series | 1.1 | 2.7 | D |
| | 17 | Spherical | 9 | 19.1 | Polyester-series | 2.2 | 4.9 | D |
| | 18 | Spherical | 9 | 18.6 | Polyester-series | 4.9 | 7.6 | D |
| | 19 | Spherical | 9 | 19.8 | Polyester-series | 9.3 | 8.9 | D |
| Comparative example | 7 | Spherical | 9 | 18.7 | Polyester-series | 0.04 | 1.7 | F |
| | 8 | Spherical | 9 | 18.4 | Polyester-series | 12 | 15.7 | D | a chemical conversion treatment and coating, to form a resin layer. The kind of the resin, the thickness of the resin layer, and the shape, the average diameter, and the content of the nickel contained in the resin layer are shown in Table 4. The average diameter of a chain-shape nickel denotes an average value of a longest diameter, when particles (average diameter 1 to 5 μm) bonded with each other so as to be like a narrow long filament are considered as one particle. In this series of examples, the shape and the average diameter of the nickel were changed for examining the influence thereby. The conductivity and the formability of the obtained resin-coated aluminum sheets were tested by the same method as in the Examples 1 to 8 according to the present invention. The results are shown in Table 4.

TABLE 4

| Classification | No. | Nickel Shape | Average diameter (μm) | Content (weight parts) | Resin layer Kind | Coating thickness (μm) | Performance Conductivity (Ω) | Formability Forming height |
|---|---|---|---|---|---|---|---|---|
| This invention | 20 | Spherical | 0.1 | 20.5 | Polyester-series | 0.1 | 8.2 | D |
| | 21 | Spherical | 5 | 19.2 | Polyester-series | 2 | 4.7 | D |
| | 22 | Spherical | 9 | 21.3 | Polyester-series | 3 | 4.2 | D |
| | 23 | Spherical | 19 | 21.7 | Polyester-series | 9 | 3.9 | D |
| | 24 | Spike-spherical | 0.3 | 19.0 | Polyester-series | 0.2 | 5.0 | D |
| | 25 | Spike-spherical | 7 | 20.2 | Polyester-series | 4 | 3.9 | D |
| | 26 | Spike-spherical | 18 | 18.8 | Polyester-series | 10 | 4.8 | D |
| | 27 | Spike-spherical | 23 | 19.7 | Polyester-series | 2.6 | 3.8 | E |
| | 28 | Spike-spherical | 92 | 21.1 | Polyester-series | 1.8 | 2.3 | E |
| | 29 | Scale-like | 0.2 | 20.3 | Polyester-series | 0.1 | 6.4 | B |
| | 30 | Scale-like | 15 | 22.6 | Polyester-series | 2 | 9.1 | B |
| | 31 | Scale-like | 50 | 20.7 | Polyester-series | 2 | 8.2 | B |
| | 32 | Scale-like | 99 | 21.4 | Polyester-series | 3 | 9.1 | B |
| | 33 | Chain-shape | 4 | 19.9 | Polyester-series | 2 | 6.4 | C |
| | 34 | Chain-shape | 9 | 19.1 | Polyester-series | 2 | 4.9 | C |
| | 35 | Chain-shape | 14 | 20.2 | Polyester-series | 2 | 3.6 | D |
| Comparative example | 9 | Spherical | 0.05 | 17.6 | Polyester-series | 2 | 130 | C |
| | 10 | Scale-like | 114 | 22.3 | Polyester-series | 2 | 3.6 | F |

Examples 36 to 49

In the same manner as in the Examples 1 to 8 according to the present invention, an aluminum coil was subjected to a chemical conversion treatment and coating, to form a resin layer. The thickness of the resin layer was 2 μm. The shape, the average diameter, the mixing ratio, the total content, of the nickel contained in the resin layer, and the kind of the resin are shown in Table 5. In this series of examples, the influence by the combination of the nickels were examined. The conductivity and the formability of the obtained resin-coated aluminum sheets were tested by the same method as in the Examples 1 to 8 according to the present invention. The results are shown in Table 5.

TABLE 5

| Classification | No. | Nickel Shape (Average diameter (μm)) Mixing ratio | Total content (weight parts) | Kind of resin | Performance Conductivity (Ω) | Formability Forming height |
|---|---|---|---|---|---|---|
| This invention | 36 | Spike-spherical (7) | 23.2 | Polyester-series | 4.3 | D |
| | 37 | Chain-shape (9) | 25.3 | Polyester-series | 4.6 | D |
| | 38 | Scale-like (14) | 25.5 | Polyester-series | 8.4 | B |
| | 39 | Chain-shape (9):Scale-like (14) = 5:95 | 25.0 | Polyester-series | 7.4 | B |
| | 40 | Chain-shape (9):Scale-like (14) = 10:90 | 24.7 | Polyester-series | 7.1 | B |
| | 41 | Chain-shape (9):Scale-like (14) = 15:85 | 24.8 | Polyester-series | 6.9 | B |
| | 42 | Chain-shape (9):Scale-like (14) = 20:80 | 25.2 | Polyester-series | 6.7 | B |
| | 43 | Chain-shape (9):Scale-like (14) = 50:50 | 25.6 | Polyester-series | 6.1 | B |
| | 44 | Chain-shape (9):Scale-like (14) = 70:30 | 25.3 | Polyester-series | 5.2 | C |
| | 45 | Spike-spherical (7):Scale-like (14) = 5:95 | 23.1 | Polyester-series | 7.2 | C |
| | 46 | Spike-spherical (7):Scale-like (14) = 10:90 | 22.8 | Polyester-series | 7.0 | C |
| | 47 | Spike-spherical (7):Scale-like (14) = 30:70 | 23.5 | Polyester-series | 5.6 | C |

TABLE 5-continued

| Classification | No. | Nickel Shape (Average diameter (μm)) Mixing ratio | Total content (weight parts) | Kind of resin | Performance Conductivity (Ω) | Formability Forming height |
|---|---|---|---|---|---|---|
| | 48 | Spike-spherical (7):Scale-like (14) = 50:50 | 23.2 | Polyester-series | 4.9 | C |
| | 49 | Spike-spherical (7):Scale-like (14) = 70:30 | 22.6 | Polyester-series | 4.6 | D |

Examples 50 to 53, and Comparative Examples 11 to 14

After providing a chemical conversion coating on an aluminum coil in the same manner as in the Examples 1 to 8 according to the present invention, a coat was applied thereon in the method shown in Table 6, to form a 2-μm-thickness resin layer for each side. The nickel amount to be added in the coating material, the shape, the average diameter, the mixing ratio, and the total content of the nickel contained in the resin layer, and the kind of the resin are shown in Table 6. Samples were collected after 30 min from the start of the coating step. In this series of examples, the coating transfer method was changed to each of the methods, as shown in FIG. 1 or FIG. 2, for examining the influence thereby. The conductivity and the formability of the obtained resin-coated aluminum sheets were tested by the same method as in the Examples 1 to 8 according to the present invention. The results are shown in Table 6.

As is apparent from the results shown in Table 6, according to the top-feed coating, a resin layer containing nickel in high concentration was stably obtained. In contrast, according to the bottom-up coating, since nickel particle was settled in a short period of time, a resin layer having stable nickel content could not be obtained with coating for a long time.

TABLE 6

| Classification | No. | Coating material Addition amount of nickel (weight parts) | Resin layer Nickel Shape | Average diameter (μm) | Content (weight parts) | Kind of resin | Supplying method of coating material - Coating method | Performance Conductivity (Ω) | Formability Forming height |
|---|---|---|---|---|---|---|---|---|---|
| This invention | 50 | 5 | Spherical | 9 | 4.9 | Polyester-series | Top feed- Direct roller coating | 7.0 | D |
| | 51 | 5 | Spherical | 9 | 4.7 | Polyester-series | Top feed- Reverse roller coating | 7.2 | D |
| | 52 | 3 | Spherical | 9 | 2.8 | Polyester-series | Top feed- Direct roller coating | 8.9 | D |
| | 53 | 3 | Spherical | 9 | 2.7 | Polyester-series | Top feed- Reverse roller coating | 9.1 | D |
| Comparative example | 11 | 5 | Spherical | 9 | 1.9 | Polyester-series | Bottom up- Direct roller coating | 13 | D |
| | 12 | 5 | Spherical | 9 | 1.8 | Polyester-series | Bottom up- Reverse roller coating | 18 | D |
| | 13 | 3 | Spherical | 9 | 0.9 | Polyester-series | Bottom up- Direct roller coating | 24 | D |
| | 14 | 3 | Spherical | 9 | 1.1 | Polyester-series | Bottom up- Reverse roller coating | 29 | D |

Examples 54 to 61, and Reference Example 1

In the same manner as in the Examples 1 to 8 according to the present invention, an aluminum coil was subjected to a chemical conversion treatment and coating, to form a resin layer. The thickness of the resin layer was 2 μm. The kind of the resin, the kind and the addition amount of the lubricating agent, the shape, the average diameter, and the content of the nickel contained in the resin layer are shown in Table 7. In this series of examples, a lubricating agent was added for examining the influence thereby. The conductivity and the formability of the obtained resin-coated aluminum sheets were tested by the same method as in the Examples 1 to 8 according to the present invention. The results are shown in Table 7.

TABLE 7

| Classification | No. | Nickel Shape (Average diameter (μm)) | Nickel Content (weight parts) | Kind of resin | Lubricant Kind | Addition amount (weight parts) | Performance Conductivity (Ω) | Performance Formability Forming height |
|---|---|---|---|---|---|---|---|---|
| This invention | 54 | Spherical (9) | 27.3 | Polyester-series | Polyethyrene-series | 0.1 | 4.3 | B |
| | 55 | Chain-shape (9): Scale-like (14) = 10:90 | 27.6 | Polyester-series | Polyethyrene-series | 0.5 | 6.9 | A |
| | 56 | Spherical (9) | 27.2 | Polyester-series | Polyethyrene-series + PTFE | 1.2 | 4.3 | B |
| | 57 | Spike-spherical (7) | 27.9 | Polyester-series | Polyethyrene-series + PTFE | 2.9 | 3.2 | B |
| | 58 | Chain-shape (9): Scale-like (14) = 15:85 | 27.2 | Epoxy-series + Phenol-series | Polyethyrene-series | 5.2 | 7.8 | A |
| | 59 | Spherical (9) | 28.2 | Polyester-series | Lanolin | 7.8 | 3.7 | B |
| | 60 | Chain-shape (9): Scale-like (14) = 15:85 | 18.1 | Melamine/Alkyd Resin + Epoxy Resin | Polyethyrene-series | 9.8 | 8.9 | A |
| | 61 | Chain-shape (9): Scale-like (14) = 10:90 | 27.7 | Alkyd Resin | Polyethyrene-series | 29.2 | 8.7 | A |
| Reference example | 1 | Spherical (9) | 27.2 | Polyester-series | Polyethyrene-series | 31.2 | 13.8 | B |

Examples 62 to 67
Influence of the Undercoat

After an aluminum coil was subjected to a degreasing treatment with a commercially available alkaline-series degreasing agent, followed by washing with water, a chemical conversion coating shown in Table 8 was provided thereon. Thereafter, the resultant coil was coil-coated in a top-feed/direct-roller method with the same coating material as the Example 6, followed by baking and drying, to form a 2-μm thickness resin layer for each side. The conductivity of the obtained resin-coated aluminum sheets were tested by the same method as in the Examples 1 to 8 according to the present invention. The results are shown in Table 9.

From the results shown above, the resin-coated aluminum sheet according to the present invention was excellent in conductivity and formability. Moreover, according to the production method of the present invention, such a resin-coated aluminum sheet with the excellent conductivity and formability could be obtained.

Since Examples 9, 12, 13 and 14 according to the present invention contained a polyester-series, or alkyd-series resin, they had a better formability compared with the Examples 10, and 11 according to the present invention. Since Example 15 according to the present invention had a relatively thin coating thickness, it had a slightly poorer formability compared with Examples 16 to 19 according to the present invention. Since Examples 29 to 32 according to the present invention used a scale-like nickel, they had a better formability, compared with Examples 20 to 28, and 33 to 35 according to the present invention. Since Example 44 according to the present invention had a small ratio of the scale-like, it had a slightly poorer formability compared with Examples 39 to 43 according to the present invention. Since Example 49 according to the present invention had a small ratio of the scale-like, it had a slightly poorer formability compared with Examples 45 to 48 according to the present invention. Since a lubricating agent was, added in Examples 54 to 61 according to the present invention, they had a better formability compared with Examples 1 to 53 according to the present invention.

TABLE 8

| Undercoat No. | Series | Type*[1] | Coating amount (mg/m²) | Name of chemical*[2] |
|---|---|---|---|---|
| I | Chromate-series (Phosphoric acid) | Rinse | Cr: 15 | Alsurf 407/47 |
| II | Chromate-series (Chromic acid) | Rinse | Cr: 25 | Alocrom 712 |
| III | Chromate-series (Phosphoric acid) | No-rinse | Cr: 30 | Zincrom R1415A |
| IV | Zirconium-series | Rinse | Zr: 10 | Alsurf 301 |
| V | Zirconium-series | No-rinse | Zr: 10 | Palcoat 3757 |
| VI | Titanium-series | Rinse | Ti: 10 | Palcoat 3750A,B |

(Note)
*[1]Rinse type: After spraying or dipping treatment, washed and dried. No-rinse type: After application, dried.
*[2]These are all trade names.

TABLE 9

| Classification | No. | Undercoat treatment No. | Performance Conductivity (Ω) |
|---|---|---|---|
| This invention | 62 | I | 3.7 |
| | 63 | II | 4.0 |
| | 64 | III | 4.3 |
| | 65 | IV | 3.7 |
| | 66 | V | 4.2 |
| | 67 | VI | 3.9 |

In contrast, among Comparative Examples 1 to 14, since a nickel was not added in No. 1, it did not show conductivity. Since a nickel addition amount was too small in No. 2, it was poor in conductivity. Since a nickel addition amount was too large in No. 3, it had a poorer formability compared with Examples according to the present inventions. Since the kind of the resin was outside the scope of the claims in Nos. 4 to 6, they were poor in formability as compared to Examples according to the present invention. Since the coating thickness was too thin in No. 7, the formability was poor. Since the coating thickness was too thick in No. 8, the conductivity was poor. Since the nickel average diameter was too small in No. 9, it was poor in conductivity as compared to Examples according to the present invention. Since the nickel average diameter was too large in No. 10 it was poor in formability as compared to Examples according to the present invention. Since the coating material was supplied in the bottom-up method in Nos. 11 to 14, nickel settlement was observed in the coater pan, and satisfactory conductivity was not obtained due to the insufficient nickel content in the resin layer. In Reference Example 1, since the addition amount of the lubricant was too large, although the formability was good, the conductivity was poor.

Having described our invention as related to the present embodiments, it is our intention that the invention not be limited by any of the details of the description, unless otherwise specified, but rather be construed broadly within its spirit and scope as set out in the accompanying claims.

We claim:

1. A resin coated metal sheet comprising a resin layer composed at least in part of a polyester, epoxy, phenol, alkyd series resin, or combination thereof, wherein said resin layer has a thickness of approximately 0.1 to 10 µm, and wherein said resin layer additionally contains approximately 2 to 60 parts by weight scale shape and chain shape embedded nickel particles to 100 parts by weight resin, wherein an average maximum diameter of said embedded nickel particles is approximately 0.1 to 100 µm, and wherein the ratio by weight of scale shape particles to chain shape particles is approximately 99:1 to 1:1.

2. The resin coated sheet of claim 1, wherein said resin layer contains approximately 4 to 50 parts by weight of the nickel particles to 100 parts by weight of the resin.

3. An apparatus formed at least in part with a resin coated metal sheet, wherein the resin coated metal sheet comprises a resin layer composed at least in part of a polyester, epoxy, phenol, alkyd series resin, or combination thereof, wherein said resin layer has a thickness of approximately 0.1 to 10 µm, and wherein said resin layer additionally contains approximately 2 to 60 parts by weight scale shape and chain shape embedded nickel particles to 100 parts by weight resin, wherein an average maximum diameter of said embedded nickel particles is approximately 0.1 to 100 µm, and wherein the ratio by weight of scale shape particles to chain shape particles is approximately 99:1 to 1:1.

4. The resin coated metal sheet of claim 1, wherein the resin layer further contains a metal selected from the group consisting of carbon, zinc, titanium, gold, silver, copper, an alloy thereof, and an oxide thereof.

5. The resin coated metal sheet of claim 1, wherein the surface occupation ratio of the nickel is 0.1% or more.

6. The resin coated metal sheet of claim 1, wherein the resin layer has a conductivity of at most 10 ohms.

7. The resin coated metal sheet of claim 1, wherein the ratio by weight of scale shape particles to chain shape particles is approximately 9:1 to 7:3.

8. The resin coated metal sheet of claim 1, wherein each resin has a molecular weight of 2,000 to 30,000.

9. The apparatus of claim 3, wherein the resin layer further contains a metal selected from the group consisting of carbon, zinc, titanium, gold, silver, copper, an alloy, and an oxide thereof.

10. The apparatus of claim 3, wherein the surface occupation ratio of the nickel is 0.1% or more.

11. The apparatus of claim 3, wherein the resin layer has a conductivity of at most 10 ohms.

12. The apparatus of claim 3, wherein the ratio by weight of scale shape particles to chain shape particles is approximately 9:1 to 7:3.

13. The apparatus of claim 3, wherein the resin has a molecular weight of 2,000 to 30,000.

14. The apparatus of claim 3, wherein the resin layer contains 4 to 50 parts by weight of the nickel particles to 100 parts by weight of the resin.

* * * * *